July 1, 1952 H. PERSSON Re. 23,519

VISE HAVING JAWS SUPPORTABLE ON FLAT SURFACE OF MACHINE TOOL BY SPINDLE ADJUSTABLE AND LOCKABLE IN PLANE PARALLEL TO SAID SURFACE

Original Filed Oct. 31, 1949

INVENTOR
HENRY PERSSON
BY Bradley Cohn
ATTORNEY

Reissued July 1, 1952 Re. 23,519

UNITED STATES PATENT OFFICE 23,519

VISE HAVING JAWS SUPPORTABLE ON FLAT SURFACE OF MACHINE TOOL BY SPINDLE ADJUSTABLE AND LOCKABLE IN PLANE PARALLEL TO SAID SURFACE

Henry Persson, Bloomfield, N. J., assignor to Float-Lock Corp., a corporation of New Jersey Original No. 2,552,580, dated May 15, 1951, Serial No. 124,681, October 31, 1949. Application for reissue January 28, 1952, Serial No. 268,638

10 Claims. (Cl. 77—63)

Matter enclosed in heavy brackets [ ] appears in the original patent but forms no part of this reissue specification; matter printed in italics indicates the additions made by reissue.

This invention is directed to the provision of work holding vise apparatus.

The novel features of the invention pertain to a vise apparatus adapted for use in connection with a machine tool such as a drill press, boring machine or the like and arranged to hold work for drilling, boring and other operations.

It is common practice particularly when drilling a work piece on a drill press or the like to clamp the work to the work support or to hold the work on said support in some manner.

When successive work pieces are to be operated on, particularly where a hole is to be in the same location on a plurality of work pieces, it is difficult and laborious to locate and hold the successive pieces to accomplish the desired results.

According to this invention, the vise apparatus may be set so that successive work pieces may be readily and easily clamped for accomplishing like operations on successive work pieces, all as will later appear.

According to special features of the invention, the vise apparatus is simple in form so as to be readily and easily assembled and therefore economical to manufacture while at the same time it is efficient in operation.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figure 1:
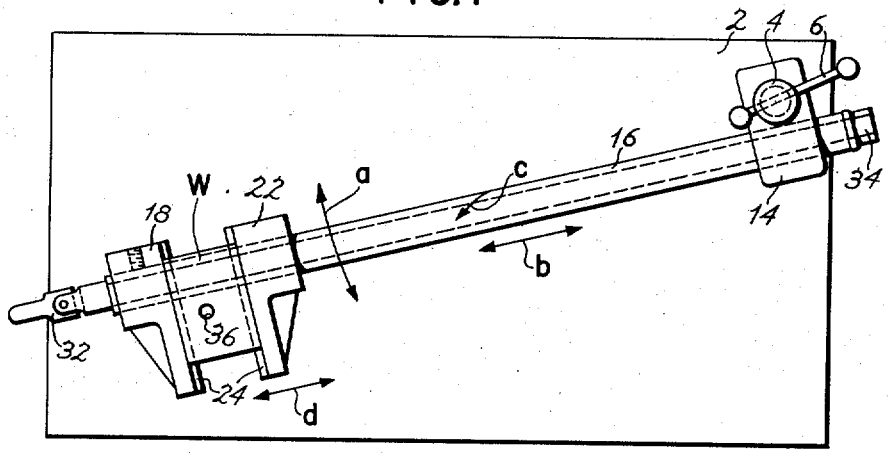
Fig. 1 is a plan view of vise apparatus embodying the novel features of the invention.

Referring now to the drawings more in detail, the invention will be fully described.

A support is shown at 2 which may be the table or bed of a machine tool such as a drill press, boring machine or the like.

A clamp bolt 4 is provided which may extend through a hole in the support 2 or it may be located in a T slot thereof and has a manually engageable bar 6 for turning the bolt. A washer 8 and nut 10 are on the lower end thereof.

Lower and upper clamp members 12 and 14 respectively are swingable on the bolt 4 and a hollow spindle 16 is rotatable and slidable between said clamp members.

The parts are arranged so that the clamp member and spindle may swing back and forth as indicated by arrow a, while the spindle may reciprocate relative to the clamp members as indicated by arrow b may rotate as indicated by arrow c.

A jaw 18 is fixed to the end of spindle 16 by any suitable means such as a set screw 20 and may be called a fixed jaw.

A jaw 22 is slidable back and forth on the spindle 16 as indicated by arrow d.

Adjacent inner sides of said jaws 18 and 22 are formed to have ledges 24 for supporting a work piece such as W. At least one of the jaws such as 18 is provided with a recess 26, see Fig. 2.

An operating screw 30 extends through the spindle 16 and has on one end an operating handle 32 and a shoulder which abuts an end of said spindle, and has on its opposite end a head 34 which prevents relative reciprocative movements of the screw in the spindle.

Figure 3:
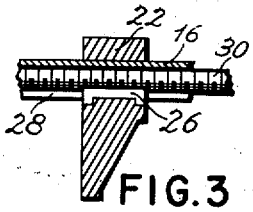
Fig. 3 is a sectional plan view through the movable jaw of the apparatus on the line 3—3 of Fig. 2.

A nut 26 carried by the jaw 22 extends through a longitudinal slot 28 provided in the spindle 16 which is in engagement with the screw 30, see Fig. 3.

As the screw is rotated in one direction or the other, the jaw 22 is moved on the spindle 16 towards or away from the jaw 18.

It will be noted that the screw is substantially enclosed so as to be protected against matter which could interfere with the operation thereof.

Figure 2:
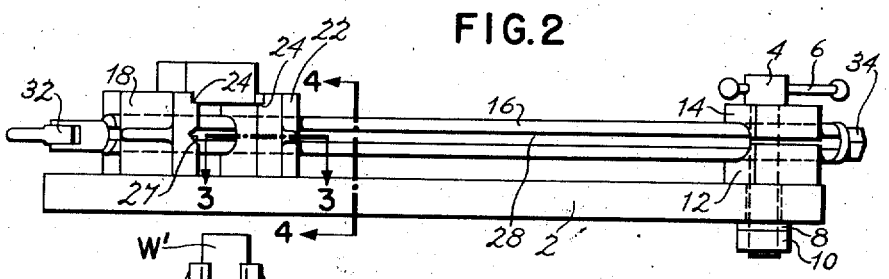
Fig. 2 is a front elevational view of the apparatus shown in Fig. 1.

The jaws 18 and 22 are adapted to be supported by the support 2 as indicated in Figs. 1 and 2. A work piece W may be clamped between the jaws 18 and 22 and with the spindle clamped by means of the members 12 and 14 and screw 4 successive work pieces may be clamped by the jaws so that holes 35 may be drilled therein.

It is possible to accurately locate holes in any number of work pieces.

Figure 5:
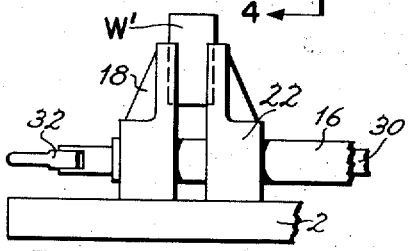
Fig. 5 is a fragmentary elevational view showing the jaws in a position different than in Fig. 1.
Figure 4:
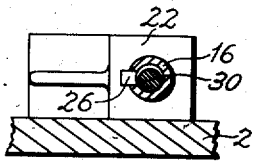
Fig. 4 is a sectional elevational view on the line 4—4 of Fig. 2.

As hereinafter explained, the jaws may be turned upwardly to the position shown in Fig. 5 and successive work pieces such as W′ may be accurately operated upon.

The jaws may be moved to any location on the support so as to have a certain relation with the tool such as a drill or the like and when fixed in a position one work piece after another may be operated on with accuracy.

The clamp members are arranged to locate the spindle so that its longitudinal axis is parallel with the surface of the support. Opposite longitudinal side faces of the jaws are parallel and end faces of said jaws are at right angles thereto. The axis of the spindle is disposed at a certain distance from the face of the support and the faces of the jaws are spaced from the axis of the spindle a distance corresponding to the certain distance. In this way the jaws may be positioned as in Figs. 2 or 5 and in either case they are supported by the support.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Vise construction for the flat surface of a support of a machine tool comprising in combination, clamp members having adjacent spindle clamping faces and being movable towards and away from one another between spindle clamping and non-clamping positions, an elongated slotted hollow spindle rotatable and slidable between said clamp members when in non-clamping position, releasable securing means, on which said clamp members are swingable, for securing said clamp members to the support against swinging and for clamping said spindle between said clamp members against rotation and sliding movements, a stationary jaw fixed to said spindle, a movable jaw slidable on said spindle towards and away from said stationary jaw, a screw rotatable in said spindle, a nut carried by said movable jaw and extending through the slot of said spindle and engaging said screw, said clamp members, when secured, positioning said spindle parallel to the flat surface of the support with the longitudinal axis thereof spaced a certain distance from the flat surface, and said jaws having end faces and parallel side faces spaced from the longitudinal axis of said spindle a distance corresponding to said certain distance whereby either the side faces or the end faces of said jaws may engage the surface of the support so that said jaws are supported hereby.

2. Vice construction for the flat horizontal supporting surface of the work support of a machine tool comprising in combination, clamp means having a lower surface for resting on the flat surface and provided with a bore having a horizontally disposed axis, means mounting the clamp means for swinging movement about a vertical axis, an elongated hollow spindle rotatable and reciprocable in the bore of said clamp means, tightening means carried by said mounting means for simultaneously holding said clamp means and said spindle against movement relative to said mounting means, a stationary jaw fixed to said spindle, a movable jaw reciprocable on said spindle and means holding the same against rotation thereon, a screw rotatable in said spindle, connections between said screw and movable jaw whereby said movable jaw may be reciprocated on said spindle by rotation of said screw, the lower surface of said clamp means being disposed a certain distance from the axis of the bore therein, and each of said jaws having an end surface and a side surface disposed relative to the axis of said spindle at distances equal to said certain distance.

3. Vice construction for the flat surface of a support of a machine tool comprising in combination, a clamp member having a spindle clamping face for movement between spindle clamping and non-clamping positions, an elongated slotted hollow spindle rotatable and slidable in said clamp member when in non-clamping position, releasable securing means, on which said clamp member is swingable, for securing said clamp member to the support against swinging and for clamping said spindle to said clamp member against rotation and sliding movements, a stationary jaw fixed to said spindle, a movable jaw slidable on said spindle towards and away from said stationary jaw, a screw rotatable in said spindle, a nut carried by said movable jaw and extending through the slot of said spindle and engaging said screw, said clamp member, when secured, positioning said spindle parallel to the flat surface of the support with the longitudinal axis thereof spaced a certain distance from the flat surface, and said jaws having end faces and parallel side faces spaced from the longitudinal axis of said spindle a distance corresponding to said certain distance whereby either the side faces or the end faces of said jaws may engage the surface of the support so that said jaws are supported thereby.

*4. Vise construction for the flat surface of a support of a machine tool comprising in combination, clamp members having adjacent spindle clamping faces and being movable towards and away from one another between spindle clamping and non-clamping positions, an elongated spindle rotatable and slidable between said clamp members when in non-clamping position, releasable securing means, on which said clamp members are swingable, for securing said clamp members to the support against swinging and for clamping said spindle between said clamp members against rotating and sliding movements, a jaw fixed along said spindle, a second jaw slidable on said spindle towards and away from said first-named jaw, said clamp members, when secured, positioning said spindle parallel to the flat surface of the support with the longitudinal axis thereof spaced a certain distance from the flat surface, and said jaws having end faces and parallel side faces spaced from the longitudinal axis of said spindle a distance corresponding to said certain distance whereby either one of the side faces or the end faces of said jaws may engage the surface of the support so that said jaws are supported thereby and secured by said flat surface against rotation.*

*5. Vice construction for the flat surface of a support of a machine tool comprising in combination, clamp members having adjacent spindle clamping faces and being movable towards and away from one another between spindle clamping and non-clamping positions, an elongated spindle rotatable and slidable between said clamp members when in non-clamping position, releasable securing means, on which said clamp members are swingable, for securing said clamp members to the support against swinging and for clamping*

*said spindle between said clamp members against rotating and sliding movements, a jaw fixed to said spindle, a second jaw slidable on said spindle towards and away from said first-named jaw, said clamp members, when secured, positioning said spindle parallel to the flat surface of the support with the longitudinal axis thereof spaced a certain distance from the flat surface, and said jaws having side faces spaced from the longitudinal axis of said spindle a distance corresponding to said certain distance whereby the side faces of said jaws may engage the surface of the support so that said jaws are supported thereby and secured by said flat surface against rotation.*

*6. Vise construction for the flat surface of a support of a machine tool comprising in combination, clamp members having adjacent spindle clamping faces and being movable towards and away from one another between spindle clamping and non-clamping positions, an elongated spindle rotatable and slidable between said clamp members when in non-clamping position, releasable securing means for securing said clamp members to the support against swinging and for clamping said spindle between said clamp members against rotating and sliding movements, a jaw fixed to said spindle, a second jaw slidable on said spindle towards and away from said first-named jaw, said clamp members, when secured, positioning said spindle parallel to the flat surface of the support with the longitudinal axis thereof spaced a certain distance from the flat surface, and each of said jaws having at least one side face spaced from the longitudinal axis of said spindle a distance corresponding to said certain distance whereby said side face may engage the surface of the support so that said jaws are supported thereby and secured on said flat surface against rotation.*

*7. Vise construction for the flat horizontal supporting surface of the work support of a machine tool comprising in combination, clamp means having a lower surface for resting on the flat surface and provided with a bore having a horizontally disposed axis, means mounting the clamp means for swinging movement about a vertical axis, an elongated spindle rotatable and reciprocable in the bore of said clamp means, tightening means carried by said mounting means for simultaneously holding said clamp means and said spindle against movement relative to said mounting means, a stationary jaw fixed to said spindle, a movable jaw reciprocable on said spindle and means to reciprocate said movable jaw on said spindle, the lower surface of said clamp means being disposed a certain distance from the axis of the bore therein, and each of said jaws having an end surface and a side surface disposed relative to the axis of said spindle at distances equal to said certain distance.*

*8. Vise construction for the flat horizontal supporting surface of the work support of a machine tool comprising in combination, clamp means having a lower surface for resting on the flat surface and provided with a bore having a horizontally disposed axis, means mounting the clamp means for swinging movement about a vertical axis, an elongated spindle rotatable and reciprocable in the bore of said clamp means, tightening means carried by said mounting means for simultaneously holding said clamp means and said spindle against movement relative to said mounting means, a stationary jaw fixed to said spindle, a movable jaw reciprocable on said spindle and means to reciprocate said movable jaw on said spindle, the lower surface of said clamp means being disposed a certain distance from the axis of the bore therein, and each of said jaws having at least one flat side surface disposed relative to the axis of said spindle at a distance equal to said certain distance.*

*9. Vise construction for the flat surface of a support of a machine tool comprising in combination, a clamp member having a spindle clamping face for movement between spindle clamping and non-clamping positions, an elongated spindle rotatable and slidable in said clamp member when in non-clamping position, releasable securing means, on which said clamp member is swingable, for securing said clamp member to the support against swinging and for clamping said spindle to said clamp member against rotating and sliding movements, a stationary jaw fixed to said spindle, a movable jaw slidable on said spindle towards and away from said stationary jaw, said clamp member, when secured, positioning said spindle parallel to the flat surface of the support with the longitudinal axis thereof spaced a certain distance from the flat surface, and said jaws having faces in a plane parallel to and spaced from the longitudinal axis of said spindle a distance corresponding to said certain distance whereby one of the faces may engage the surface of the support so that said jaws are supported thereby and secured by said flat surface against rotation.*

*10. Vise construction for the flat surface of a support of a machine tool comprising in combination, clamp members having adjacent spindle clamping faces and being movable towards and away from one another between spindle clamping and non-clamping positions, an elongated spindle rotatable and slidable between said clamp members when in non-clamping position, releasable securing means, on which said clamp members are swingable, for securing said clamp members to the support against swinging and for clamping said spindle between said clamp members against rotating and sliding movements, a jaw fixed to said spindle, a second jaw slidable on said spindle towards and away from said first-named jaw, said clamp members, when secured, positioning said spindle parallel to the flat surface of the support with the longitudinal axis thereof spaced a certain distance from the flat surface, and at least one of said jaws having at least one flat side surface disposed relative to the axis of said spindle at a distance equal to said certain distance.*

HENRY PERSSON.

REFERENCES CITED

The following references are of record in the file of this patent:

UNITED STATES PATENTS

| Number | Name | Date |
|---|---|---|
| 711,607 | Williamson | Oct. 21, 1902 |
| 1,163,145 | Gross | Dec. 7, 1915 |
| 1,440,167 | Ober | Dec. 26, 1922 |
| 2,338,471 | Vanerstrom | Jan. 4, 1944 |